(12) United States Patent
Yan (10) Patent No.: US 8,141,967 B2
(45) Date of Patent: Mar. 27, 2012

(54) DISPLAY DEVICE WITH MOVING CONTROLLER, THE CONTROLLER CAPABLE OF MOVING HORIZONTALLY

(75) Inventor: Shuo-Ting Yan, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 1123 days.

(21) Appl. No.: 12/005,930

(22) Filed: Dec. 29, 2007

(65) Prior Publication Data

US 2008/0158446 A1     Jul. 3, 2008

(30) Foreign Application Priority Data

Dec. 29, 2006   (TW) ............................... 95149694 A (51) Int. Cl.
  *A47B 91/00*     (2006.01)
(52) U.S. Cl. .................. 312/351.13; 348/794; 348/836; 248/129; 188/1.12
(58) Field of Classification Search .................. 348/794, 348/836, 837, 838, 839, 843, E5.128; 267/166, 267/166.1; 312/351.11, 351.13; 16/32, 33, 16/34; 248/129; 188/1.12, 19
  See application file for complete search history.

(56) References Cited

U.S. PATENT DOCUMENTS

| | | | | |
|---|---|---|---|---|
| 1,328,458 | A * | 1/1920 | Schiek et al. ................. | 248/129 |
| 2,379,476 | A * | 7/1945 | Cleveland, Jr. ............ | 280/43.15 |
| 3,272,496 | A * | 9/1966 | Halopoff et al. ................. | 267/74 |
| 3,363,725 | A * | 1/1968 | Lorrance ....................... | 188/2 R |
| 3,409,105 | A * | 11/1968 | Clinton .......................... | 188/29 |
| 3,563,563 | A * | 2/1971 | Radovic ..................... | 280/79.11 |
| 3,988,800 | A * | 11/1976 | Sachser ........................ | 16/35 R |
| 4,128,144 | A * | 12/1978 | Vassar .......................... | 188/1.12 |
| 4,669,580 | A * | 6/1987 | Neville ........................ | 188/1.12 |
| 4,722,114 | A * | 2/1988 | Neumann ..................... | 16/35 R |
| 4,815,161 | A * | 3/1989 | Timmer et al. ............... | 16/35 R |
| 5,149,113 | A * | 9/1992 | Alldredge ....................... | 280/30 |
| 5,774,936 | A * | 7/1998 | Vetter ......................... | 16/35 R |
| 5,918,841 | A * | 7/1999 | Sweere et al. ........... | 248/123.11 |
| 6,109,625 | A * | 8/2000 | Hewitt ....................... | 280/43.24 |
| 6,286,183 | B1 * | 9/2001 | Stickel et al. .................. | 16/35 R |
| 6,336,524 | B1 * | 1/2002 | Van Loon et al. ............ | 188/1.12 |
| 6,584,641 | B1 * | 7/2003 | Milbredt ....................... | 16/35 R |
| 6,594,951 | B1 * | 7/2003 | Reynolds ......................... | 47/39 |
| 6,669,639 | B1 * | 12/2003 | Miller et al. .................. | 600/443 |
| 7,021,773 | B2 * | 4/2006 | Ishino .......................... | 353/119 |
| 7,044,569 | B1 * | 5/2006 | Relyea et al. ............ | 312/249.11 |
| 7,108,380 | B1 * | 9/2006 | Ishino ............................. | 353/70 |
| 7,182,178 | B2 * | 2/2007 | Chung ......................... | 188/1.12 |
| 7,198,138 | B2 * | 4/2007 | Chadha et al. ............. | 188/79.55 |
| 7,261,261 | B2 * | 8/2007 | Ligertwood .................. | 248/129 |
| 7,621,544 | B2 * | 11/2009 | Rossini ........................ | 280/79.3 |

(Continued)

FOREIGN PATENT DOCUMENTS

CN    1127048 C    11/2003

(Continued)

*Primary Examiner* — William Gilbert
*Assistant Examiner* — James Ference
(74) *Attorney, Agent, or Firm* — Altis Law Group, Inc.

(57) ABSTRACT

An exemplary display device (2) includes a display body (22) and a support body (23) configured for supporting and moving the display body. The support body includes at least one trolley wheel assembly (28) capable of moving horizontally, and at least one stopper (380) corresponding to the trolley wheel assembly, which is capable of braking the trolley wheel assembly. The display body is moved horizontally when the trolley wheel assembly is moved horizontally.

16 Claims, 6 Drawing Sheets

U.S. PATENT DOCUMENTS

| | | | |
|---|---|---|---|
| 2003/0132065 A1* | 7/2003 | Suzuki | 188/1.12 |
| 2004/0046487 A1* | 3/2004 | Olivera et al. | 312/209 |
| 2004/0068185 A1* | 4/2004 | Marshall et al. | 600/437 |
| 2004/0105733 A1* | 6/2004 | Hewitt | 410/66 |
| 2004/0262867 A1* | 12/2004 | Arceta et al. | 280/47.35 |
| 2005/0023787 A1* | 2/2005 | Haynes | 280/79.11 |
| 2005/0230573 A1* | 10/2005 | Ligertwood | 248/158 |
| 2005/0275178 A1* | 12/2005 | Huesdash et al. | 280/47.35 |
| 2006/0077636 A1* | 4/2006 | Kim | 361/688 |
| 2006/0082088 A1* | 4/2006 | Webster et al. | 280/79.11 |
| 2006/0163829 A1* | 7/2006 | Livengood et al. | 280/87.021 |

FOREIGN PATENT DOCUMENTS

| | | |
|---|---|---|
| CN | 2671077 Y | 1/2005 |
| TW | M250844 Y | 11/2004 |

* cited by examiner

DISPLAY DEVICE WITH MOVING CONTROLLER, THE CONTROLLER CAPABLE OF MOVING HORIZONTALLY

FIELD OF THE INVENTION

The present invention relates to a display device which includes a display body and a moving controller, the moving controller configured for moving the display body horizontally.

GENERAL BACKGROUND

Figure 6:
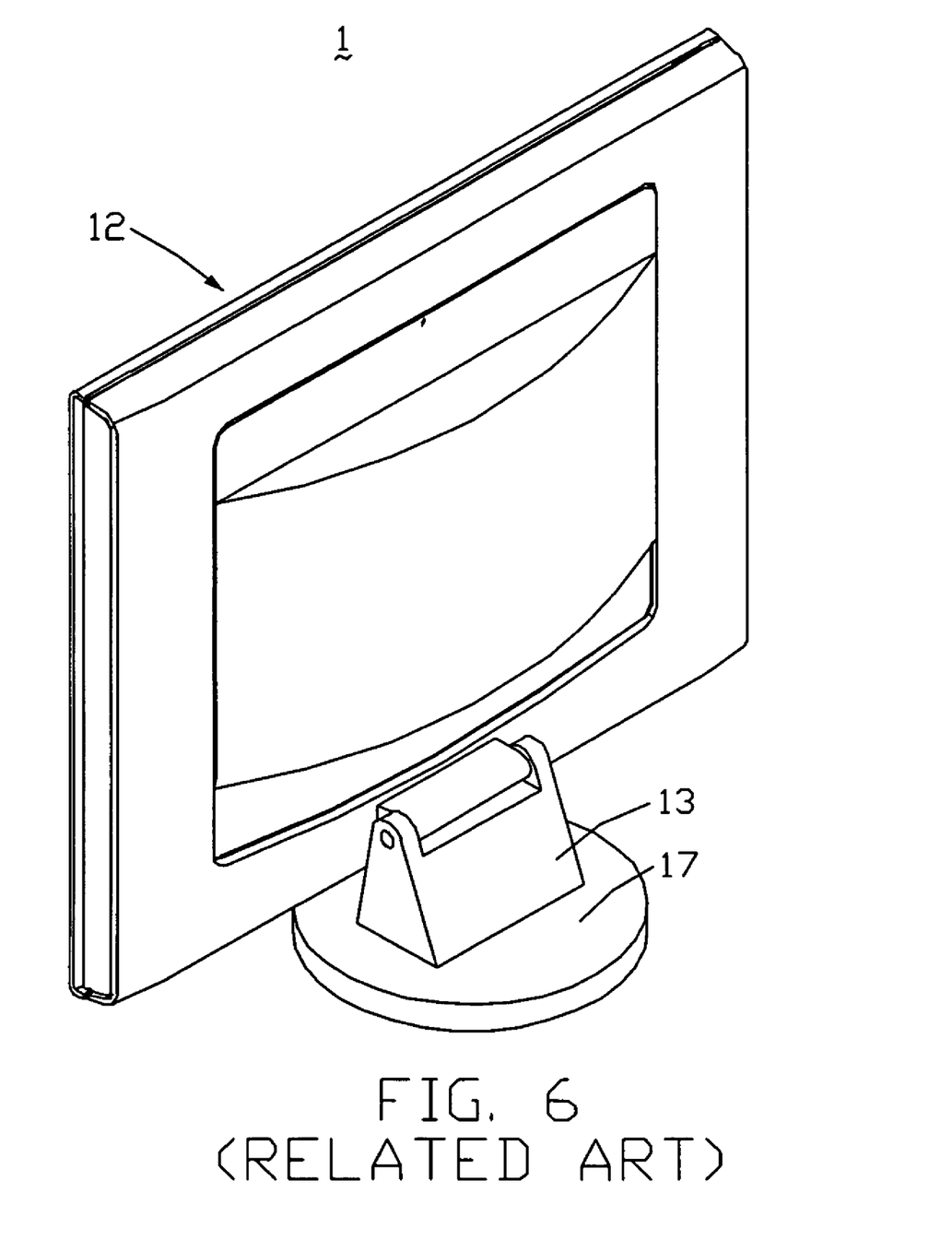
FIG. 6 is an isometric view of a conventional display device.

FIG. 6 is an isometric view of a typical display device 1. The display device 1 includes a display body 12, a neck 13, and a base 17. The neck 13 and the base 17 are integrally formed. The neck 13 is pivotally connected with the display body 12.

When the display device 1 needs to be moved from one position to another on a desktop or tabletop, this must be done manually. Such manual changing of positions can be quite inconvenient. If the display device 1 is big and heavy, it may be difficult for a user to move the display device 1.

What is needed, therefore, is a display device that can overcome the above-described deficiencies.

SUMMARY

In one preferred embodiment, a display device includes a display body and a support body configured for supporting and moving the display body. The support body includes at least one trolley wheel assembly capable of moving horizontally, and at least one stopper corresponding to the trolley wheel assembly. The stopper is capable of braking the trolley wheel assembly. The display body is moved horizontally when the trolley wheel assembly is moved horizontally.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
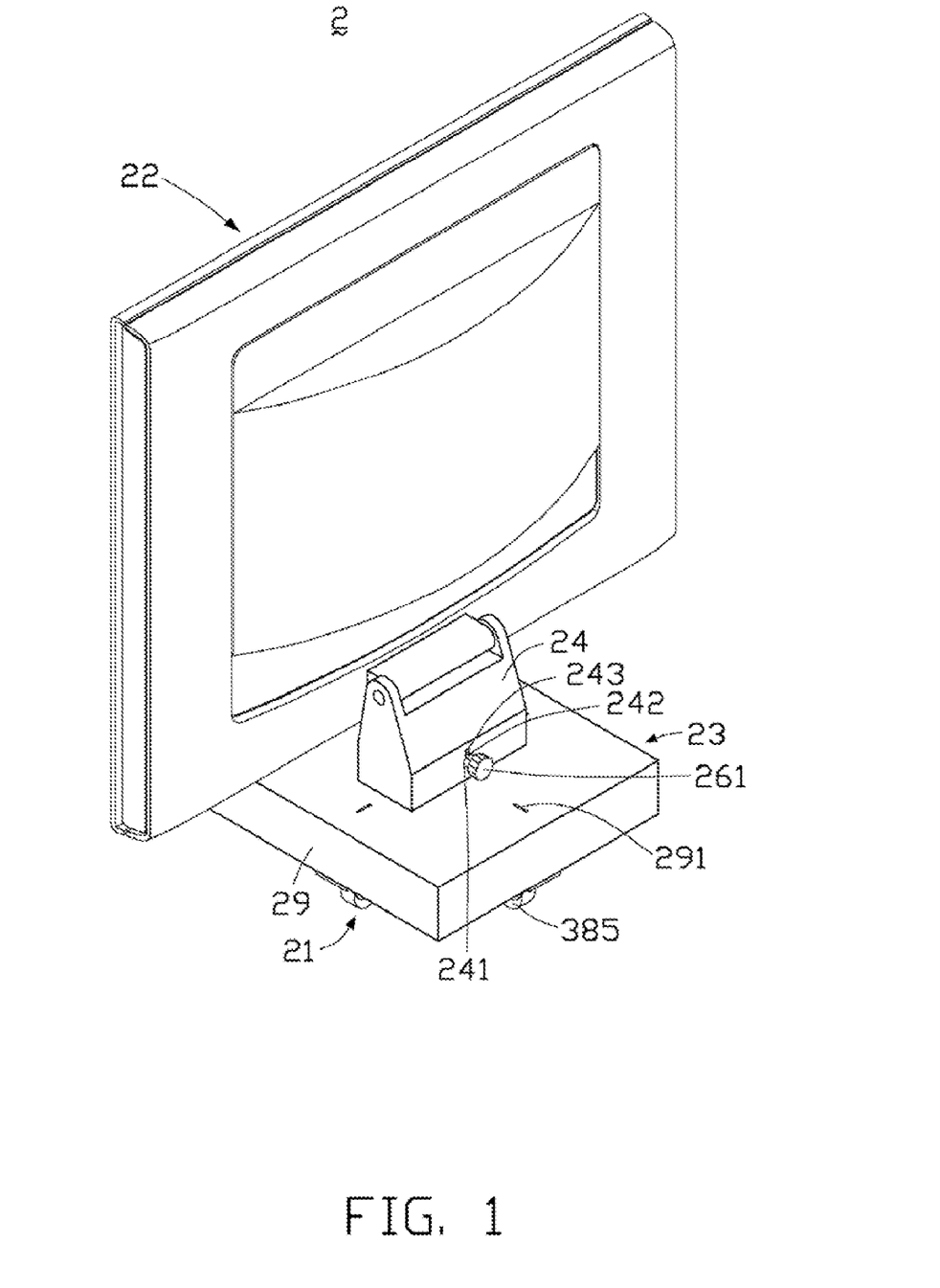
FIG. 1 is an isometric view of a display device according to an exemplary embodiment of the present invention, the display device including a support body, the support body including a moving controller (only partly visible).

FIG. 1 is a schematic, isometric view of a display device 2 according to an exemplary embodiment of the present invention. The display device 2 includes a display body 22, and a support body 23 configured for supporting the display body 22.

The display body 22 can be a flat panel display, such as a liquid crystal display. The support body 23 includes a neck 24, a base 29, and a moving controller 21. The neck 24 is pivotally connected to the display body 22. The base 29 has a box-shaped structure, and a top surface of the base 29 is rectangular. The neck 24 is formed on the middle of the top surface of the base 29. The neck 24 and the base 29 are integrally formed into one piece. The moving controller 21 is received in the base 29. The neck 24 defines a through hole 241 and a vertical groove 243 in a back wall thereof. The through hole 241 is located in a middle portion of the back wall. The neck 24 includes a block 242 disposed in the groove 243. The block 242 can be moved up and down along the groove 243 by the application of an external force. The base 29 defines four location slots 291, which are perpendicular to the four edges of the top surface of the base 29 respectively.

Figure 2:
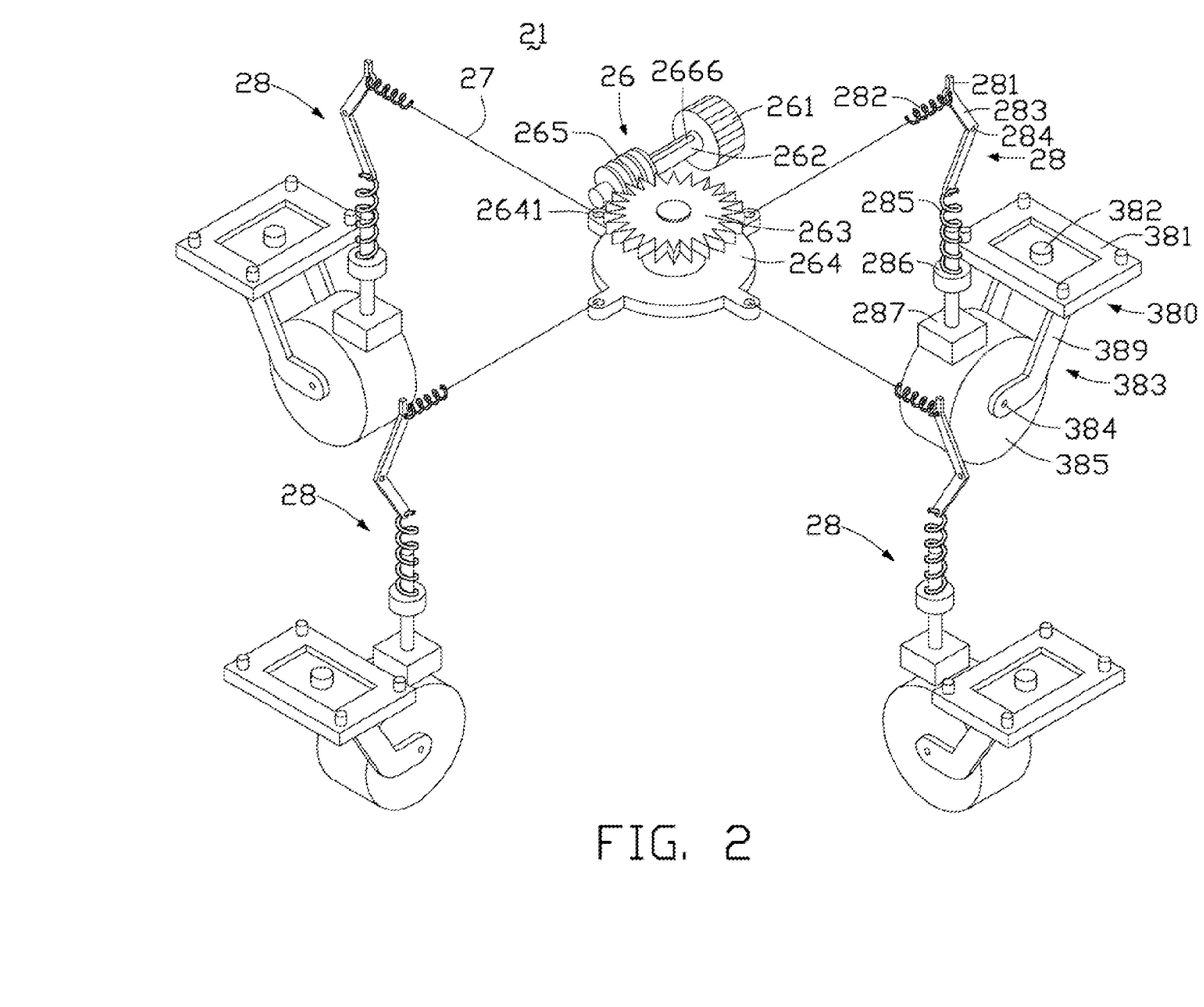
FIG. 2 is an enlarged, isometric view of the moving controller of the display device of FIG. 1, the moving controller including a driver.

Referring also to FIG. 2, the moving controller 21 includes a driver 26, four stoppers 28, and four trolley wheel assemblies 380. The four trolley wheel assemblies 380 are arranged at four points of an imaginary cross.

The driver 26 includes a knob 261, a screw 262, a gear 263, a steering board 264, and four steel wires 27. The screw 262 extends through the through hole 241. One end of the screw 262 is connected to the knob 261, with the knob 261 located outside of the back wall of the neck 24. A middle portion of the screw 262 is generally bar-shaped, and a channel 2666 is defined in this middle portion. The screw 262 has a whorl 265 formed on an opposite end thereof. The gear 263 is engaged with the whorl 265 of the screw 262. The gear 263 is disposed on the steering board 264, with the gear 263 and the steering board 264 being joined together. The steering board 264 can be wheeled by the gear 263 when the gear 263 is turned by the screw 262. The steering board 264 is essentially circular, and has two pairs of steering protrusions 2641. Each steering protrusion 2641 in each pair of steering protrusions 2641 is symmetric to the other steering protrusion 2641 in the pair across a center of the steering board 264. The steering protrusions 2641 are arranged like four points of an imaginary cross. The four steering protrusions 2641 each are connected to the stoppers 28 via the four steel wires 27 respectively. Thereby, the driver 26 can drive the stoppers 28 via the steel wires 27 according to a moving mode or a braking mode of the support body 23.

Each of the stoppers 28 includes a horizontal spring 282, a bent shaped lever 283, a vertical spring 285, a post 286, and a brake 287. The horizontal spring 282 is connected to a corresponding steel wire 27, and to a top end portion of the lever 283. The other bottom end portion of the lever 283 is connected to the vertical spring 285. The lever 283 includes a pivot axle 284 and a location protrusion 281. The pivot axle 284 is arranged in the middle of the lever 283, and is pivotally connected to an inside of a corresponding one of the sidewalls of the base 29. The location protrusion 281 extends upwardly from the top end portion of the lever 283. The location protrusion 281 is received in a corresponding one of the location slots 291, and can smoothly slide horizontally along the location slot 291. An upper portion of the post 286 extends inside the vertical spring 285. Thereby, the vertical spring 285 is prevented from shifting or deflecting, and can be maintained in a vertical orientation. A bottom end of the post 286 is connected with the brake 287. The brake 287 is adjacent to the trolley wheel assembly 380. The brake 287 can be made from rubber.

Each of the trolley wheel assemblies 380 includes a holding board 381, a spindle 382, a wheeling structure 383, and a wheel 385. The wheeling structure 383 includes a pair of arms 389, a connection board 386 (see FIG. 4) located underneath the holding board 381, and an axle 384 which serves as an axle of the wheel 385. The arms 389 are generally L-shaped. A bottom end of each arm 389 is connected to a corresponding end of the axle 384. A top end of each arm 389 is connected to the connection board 386. The connection board 386 defines a hole (not visible) in the middle thereof. The spindle 382 is fixed on the holding board 381. A top end of the spindle 382 protrudes up from a middle of the holding board 381. A bottom end of the spindle 382 protrudes down from the middle of the holding board 381, and is movably received in the hole of the connection board 386. Thereby, the connection board 386 is pivotable about the spindle 382, such that the connection board 386 can turn relative to the holding board 381.

Figure 3:
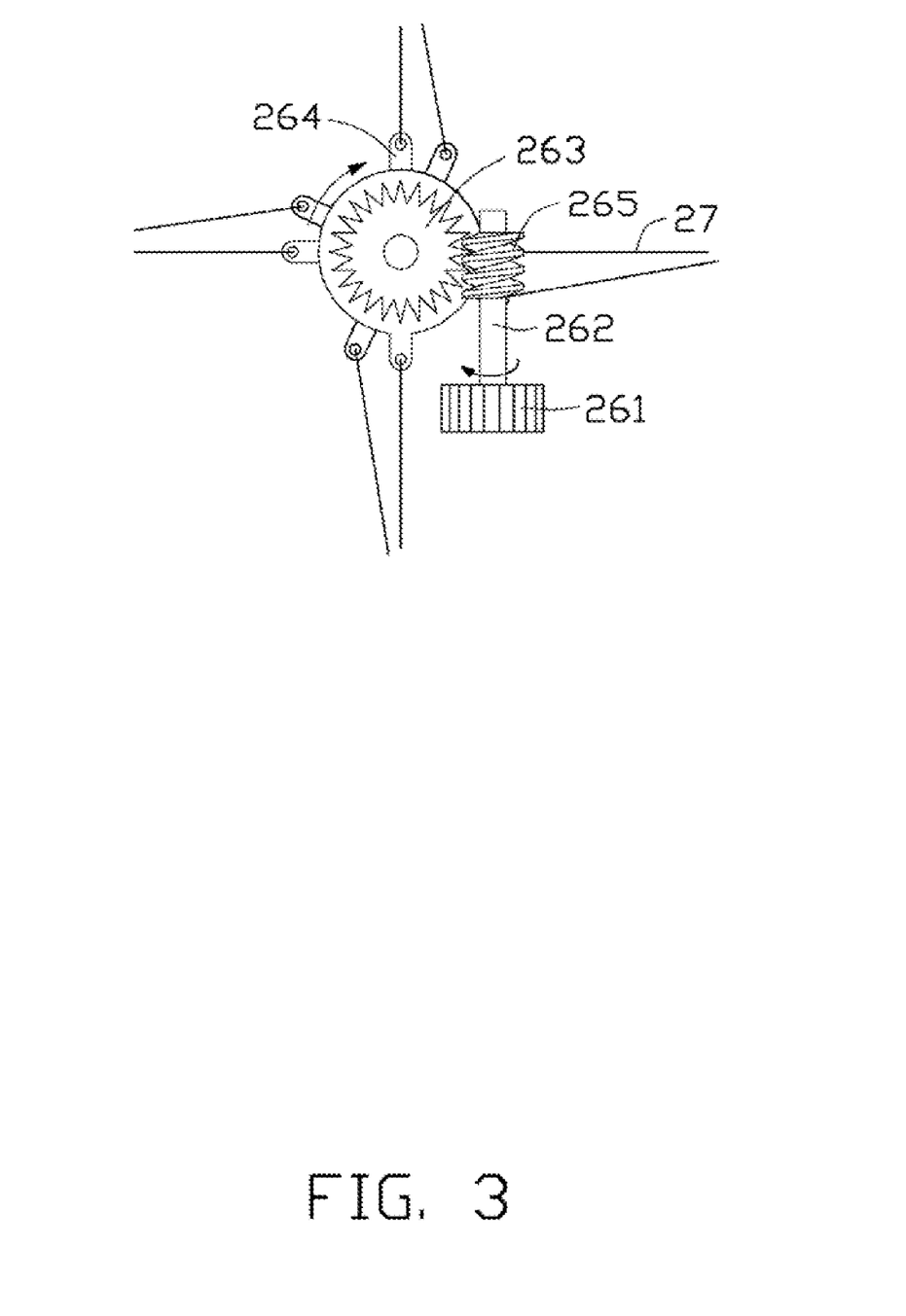
FIG. 3 is an enlarged, top plan view of the driver of FIG. 2.

Referring to FIG. 3, an enlarged, top plan view of the driver 26 is shown. When the display device 2 needs to be moved, the block 242 is pulled up from its engagement in the channel 2666, so that the knob 261 and the screw 262 can be rotated freely. Then the knob 261 is rotated counterclockwise by a user, and the screw 262 rotates along with the knob 261. The gear 263 and the steering board 264 are thereby rotated clockwise. Consequently, the steering protrusions 2641 are shifted from original positions, and the corresponding steel wires 27 are shifted from original positions.

Figure 4:
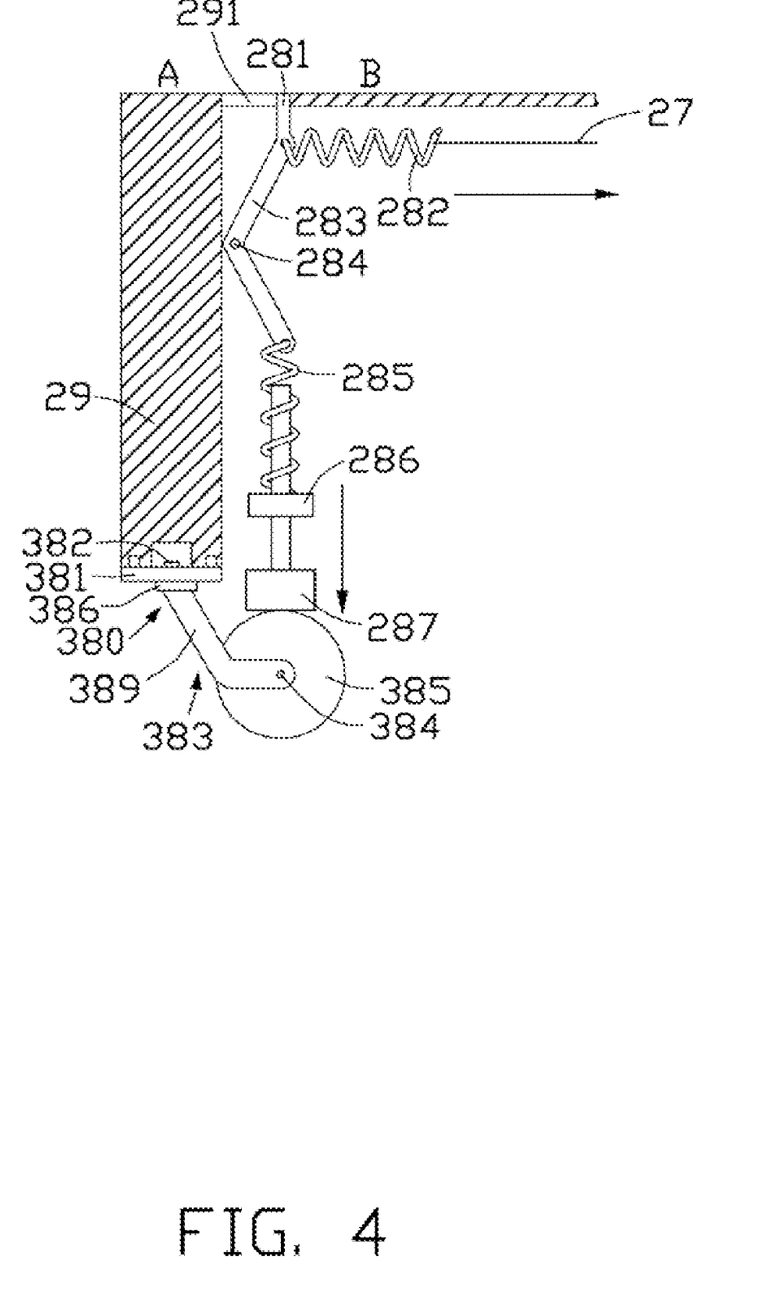
FIG. 4 is an enlarged, cutaway view of the support body and part of the moving controller of FIG. 1, showing the moving controller in a braking mode.

Referring also to FIG. 4, an enlarged, cutaway view of the support body 23 and part of the moving controller 21 is shown, with the moving controller 21 being in a braking mode. The steel wire 27 is shifted inwardly from the original position. The horizontal spring 282 is pulled inward. The horizontal spring 282 is elongated, and drags the location protrusion 281 inward along the slot 291. The location protrusion 281 is stopped at an inner end (denoted as "B") of the location slot 291. The lever 283 is pivoted inward and down, and the vertical spring 285 is pushed down. The post 286 is pushed down, and the brake 287 is pushed down to contact the wheel 385. Friction between the brake 287 and the wheel 385 prevents the wheel 385 from turning. The channel 2666 of the screw 262 directly faces the block 242, and turning of the knob 261 is stopped when the channel 2666 is in such position. The block 242 is pushed into the channel 2666 so as to block movement of the screw 262 and prevent the knob 261 from being turned. Thus, the support body 23 is in a braking mode.

Figure 5:
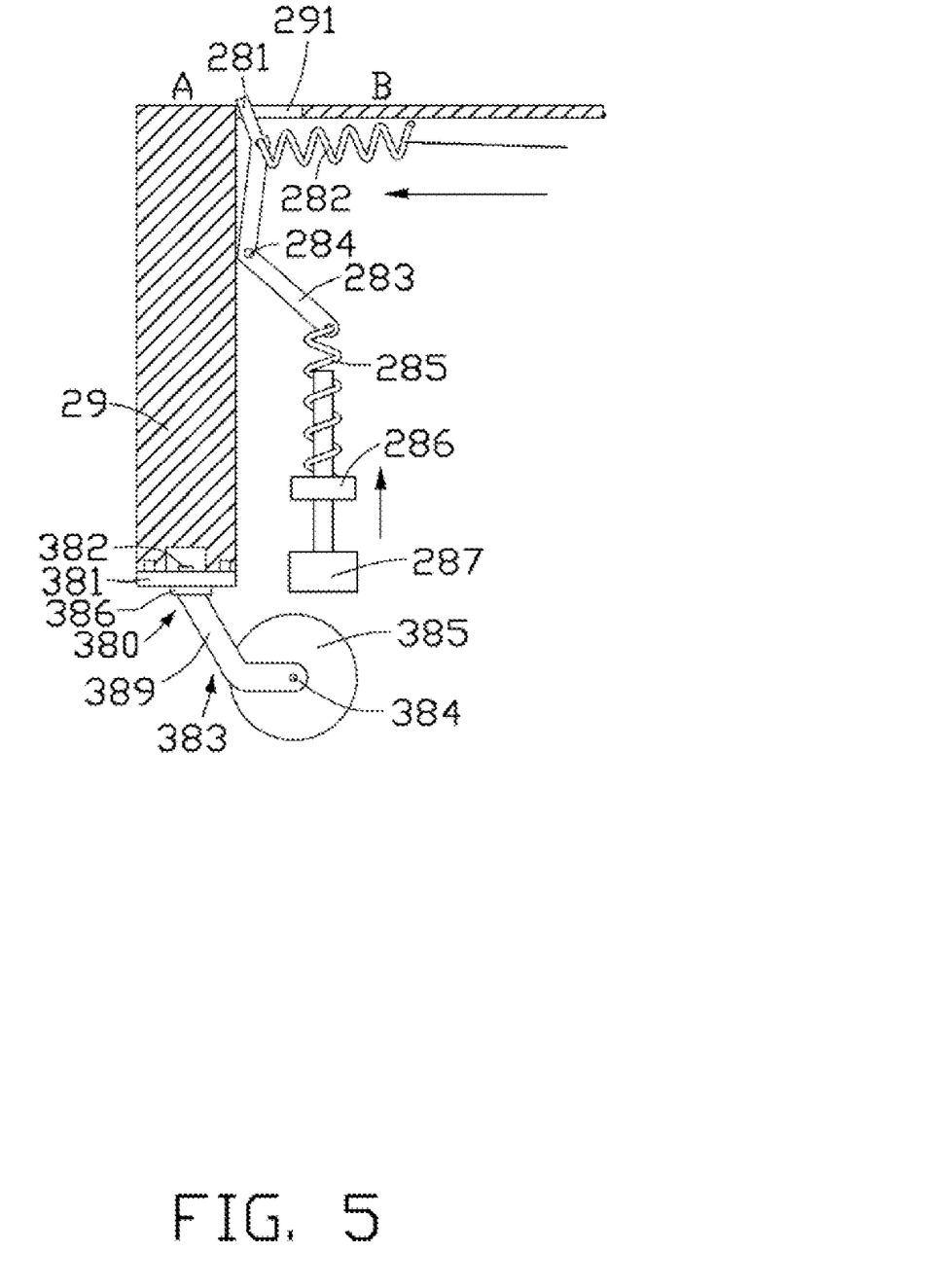
FIG. 5 is similar to FIG. 4, but showing the moving controller in a moving mode.

Referring also to FIG. 5, the moving controller 21 being in a moving mode is shown. The block 242 is pulled out from the channel 2666. The knob 261 is rotated clockwise by the user. The screw 262 rotates along with the knob 261. The gear 263 and the steering board 264 are thereby rotated counterclockwise. Consequently, the steering protrusions 2641 are shifted back to their original positions. Thus, the steel wire 27 is pushed outward. The horizontal spring 282 is compressed, and drags the location protrusion 281 outward along the slot 291. The location protrusion 281 is forced toward the border of the base 29 and stopped at an outer end (denoted as "A") of the location slot 291. The lever 283 is pivoted outward and up, the vertical spring 285 is pulled up. The post 286 is pulled up by the vertical spring 285. The brake 287 is therefore pulled up along with the post 286, and separated from the wheel 385.

In the moving mode, the wheels 385 can be rolled freely. In addition, the trolley wheel assemblies 380 can rotate about the spindles 382. Thus the display device 2 can be easily moved across a surface such as a desktop or tabletop, with the direction of movement able to be readily changed.

In summary, the display device 2 includes the moving controller 21. Unlike the above-described conventional display device 1, the display device 2 can be moved easily and freely by operation of the moving controller 21.

Alternative embodiments may include the following. For example, the moving controller 21 can include three trolley wheel assemblies 380 and three stoppers 28, or more than four trolley wheel assemblies 380 and more than four stoppers 28, with the number of trolley wheel assemblies 380 being the same as the number of stoppers 28 respectively. In another example, a clockwise rotation of the knob 261 can correspond to the braking mode of the trolley wheel assemblies 380, and a counterclockwise rotation of the knob 261 can correspond to the moving mode of the trolley wheel assemblies 380.

It is to be further understood that even though numerous characteristics and advantages of preferred embodiments have been set out in the foregoing description, together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. A display device comprising:
    a display body and a support body connected to and supporting the display body, the support body comprising:
    a plurality of trolley wheel assemblies at a bottom of the support body;
    at least one stopper mechanism configured to selectively brake the trolley wheel assemblies and thereby hold the display device in a fixed position, and release the trolley wheel assemblies so that the display device is freely movable along a surface; and
    a driver configured for controlling the at least one stopper mechanism whether to brake the trolley wheel assemblies or not, and the driver comprising at least one steel wire connected to the at least one stopper mechanism.

2. The display device in claim 1, wherein the driver further comprises a knob, a screw, a gear, and a round steering board comprising at least one steering protrusion, the knob being connected to one end of the screw, the other end of the screw comprising a plurality of whorls engaging the gear, and the at least one steering protrusion being connected with the at least one steel wire.

3. The display device in claim 2, wherein each of the at least one stopper mechanism comprises a lever and a brake, the lever comprising a pivot axle, the pivot axle disposed in the middle of the lever, one end of the lever being connected to a corresponding one of the at least one steel wire, and the other end of the lever being connected to the brake.

4. The display device in claim 3, wherein the lever is bent shaped.

5. The display device in claim 3, wherein each of the at least one stopper mechanism further comprises a horizontal spring and a vertical spring, one end of the lever being connected to the corresponding one of the at least one steel wire via the horizontal spring, and the other end of the lever being connected to the brake via the vertical spring.

6. The display device in claim 5, wherein each of the at least one stopper mechanism further comprises a post connected between the vertical spring and the brake.

7. The display device in claim 3, wherein each of the trolley wheel assemblies comprises a holding board, a spindle, a wheel, and a wheeling structure, the wheeling structure comprising a pair of arms, a connection board and an axle, the arms connected between the connection board and the axle, the connection board being disposed underneath the holding board, the axle being disposed at a center of the wheel, the connection board defining a hole in the middle, and the spindle being disposed on the holding board and vertically penetrating the hole of the connection board.

8. The display device in claim 7, wherein the support body further comprises a base for receiving the driver and a neck formed on the middle of a top surface of the base, the display body being pivotally connected with the neck.

9. The display device in claim 8, wherein the neck and the base are integrally formed into one piece.

10. The display device in claim 8, wherein the neck defines a through hole and a groove in a middle position of the neck, the groove in communication with the through hole, and the neck comprising a block disposed in the groove.

11. The display device in claim 10, wherein the base defines at least a location slot perpendicular and adjacent to an edge of the top surface of the base and corresponding to the block.

12. The display device in claim 11, wherein, the block is capable of moving along the groove.

13. The display device in claim 12, wherein the lever further comprises a location protrusion extending upwardly from the end connected to the horizontal spring, the location protrusion partially protruding out of the slot and being capable of moving along the slot under external force.

14. The display device in claim 2, wherein the support body comprises four trolley wheel assemblies and four stopper mechanisms, the steering board comprising four steering protrusions arranged symmetrically at the border of the steering board.

15. The display device in claim 1, wherein the display body is a flat panel display.

16. The display device in claim 15, wherein the flat panel display is a liquid crystal display.

* * * * *